United States Patent
Kain

(10) Patent No.: US 6,592,183 B2
(45) Date of Patent: Jul. 15, 2003

(54) VEHICLE ANCHOR SYSTEM FOR JUVENILE VEHICLE SEAT

(75) Inventor: James M. Kain, Troy, OH (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 10/074,637

(22) Filed: Feb. 13, 2002

(65) Prior Publication Data

US 2002/0113470 A1 Aug. 22, 2002

Related U.S. Application Data

(60) Provisional application No. 60/307,909, filed on Jul. 26, 2001, and provisional application No. 60/269,596, filed on Feb. 16, 2001.

(51) Int. Cl.[7] .................................................. B60N 2/28
(52) U.S. Cl. ................. 297/253; 297/250.1; 297/256.16
(58) Field of Search ............................ 297/253, 256.16, 297/250.1

(56) References Cited

U.S. PATENT DOCUMENTS

| | | | |
|---|---|---|---|
| 4,685,741 A | 8/1987 | Tsuge et al. ......... 297/250.1 X |
| 4,834,420 A * | 5/1989 | Sankrithi et al. ..... 297/250.1 X |
| 5,098,161 A * | 3/1992 | Minami et al. ...... 297/250.1 X |
| 5,115,523 A | 5/1992 | Cone ...................... 297/464 X |
| 5,538,322 A | 7/1996 | Cone et al. ............ 297/256.15 |
| 5,567,007 A | 10/1996 | Czernakowski et al. . 297/250.1 |
| 5,611,596 A | 3/1997 | Barley et al. .......... 297/256.13 |
| 5,630,645 A * | 5/1997 | Lumley et al. ........... 297/250.1 |
| 5,671,971 A | 9/1997 | Koyanagi et al. ........ 297/250.1 |
| 5,695,243 A * | 12/1997 | Anthony et al. ......... 297/250.1 |
| 5,890,762 A | 4/1999 | Yoshida ............. 297/256.16 X |
| 6,000,753 A | 12/1999 | Cone, II .................. 297/253 X |
| 6,017,087 A * | 1/2000 | Anthony et al. ......... 297/253 X |
| 6,024,408 A | 2/2000 | Bello et al. .............. 297/250.1 |
| 6,030,047 A | 2/2000 | Kain .................... 297/250.1 X |
| 6,193,310 B1 | 2/2001 | Batalaris et al. ............ 297/253 |
| 6,425,632 B1 * | 7/2002 | Anthony et al. ........ 297/253 X |
| 2003/0030311 A1 * | 2/2003 | Woodard et al. ........ 297/253 X |

* cited by examiner

Primary Examiner—Rodney B. White
(74) Attorney, Agent, or Firm—Barnes & Thornburg

(57) ABSTRACT

A juvenile seat assembly is provided for use with a vehicle seat. The assembly includes a juvenile seat for placement on the vehicle seat and a vehicle anchor system coupled to the seat. The juvenile seat includes a first pair of openings and a second pair of openings. The vehicle anchor system includes an anchor belt adapted to be coupled to a pair of anchor mounts provided in or near the vehicle seat. The anchor belt includes a strap having a central portion and opposite end portions, and a connector coupled to each end portion and adapted to be coupled to one of the anchor mounts. The anchor belt is threaded through the first openings to position the seat in a first, rearwardly facing position and the anchor belt is threaded through the second openings to position the seat in a second, forwardly facing position. The vehicle anchor system also includes a leash coupled to the juvenile seat and to the central portion of the anchor belt. The leash remains coupled to the seat and to the anchor belt when the anchor belt is moved between the first and second openings of the seat.

40 Claims, 13 Drawing Sheets

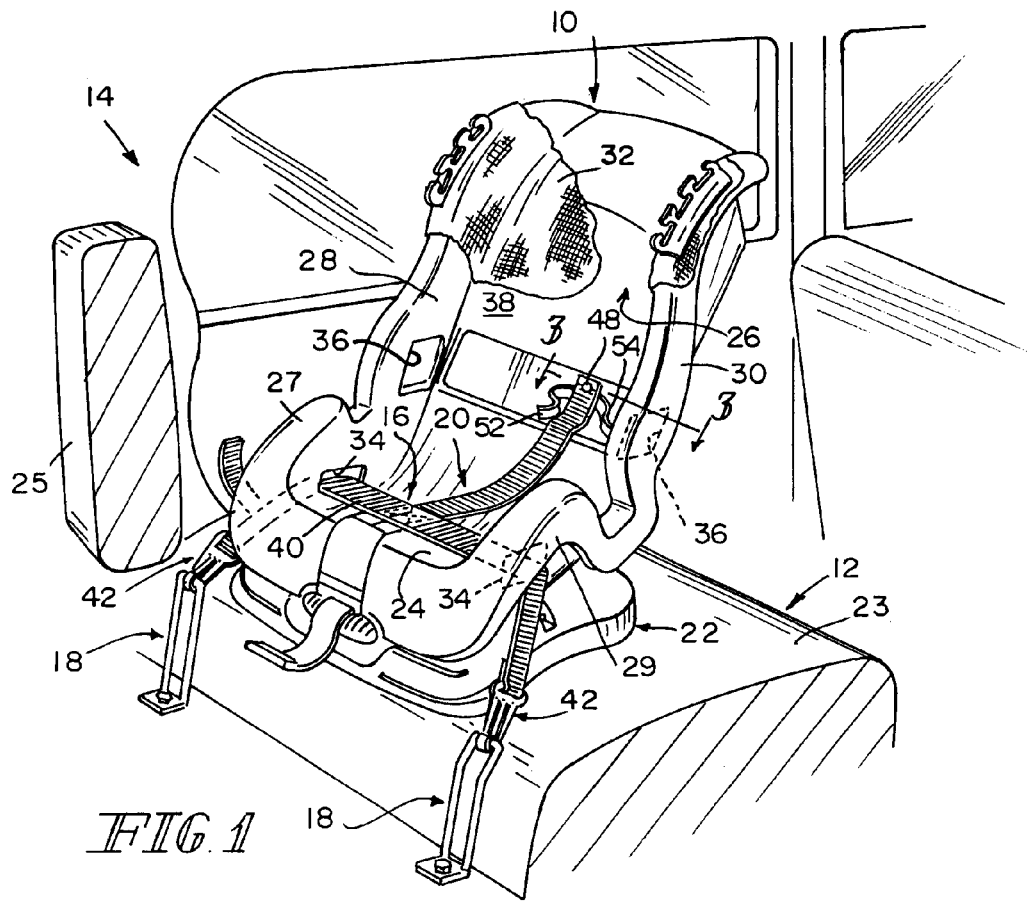
FIG. 1
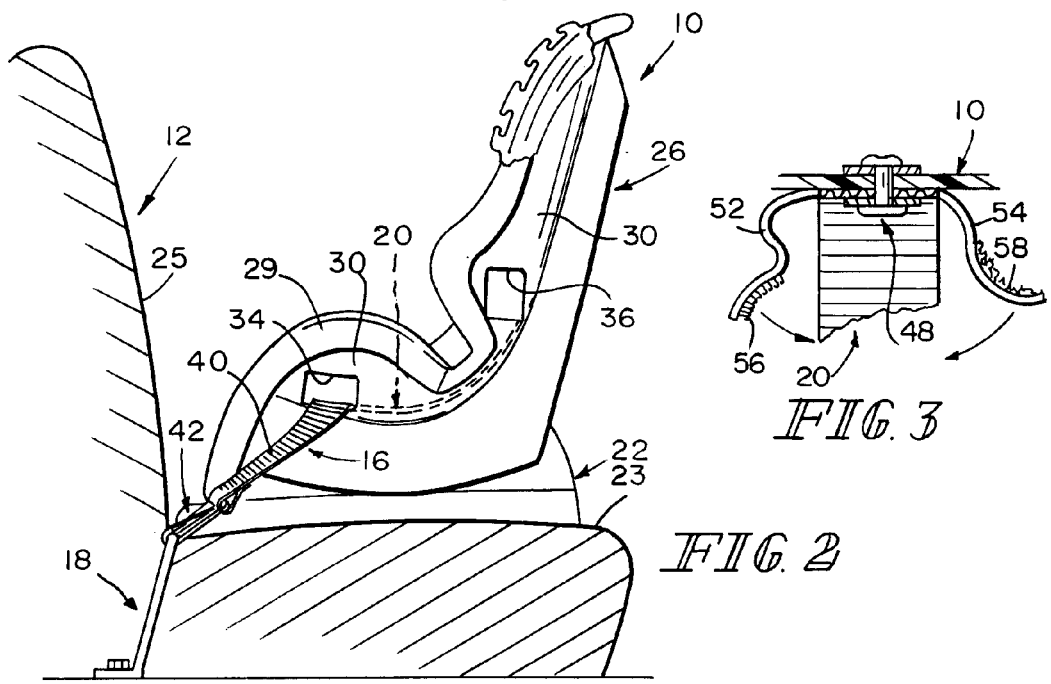
FIG. 2
FIG. 3

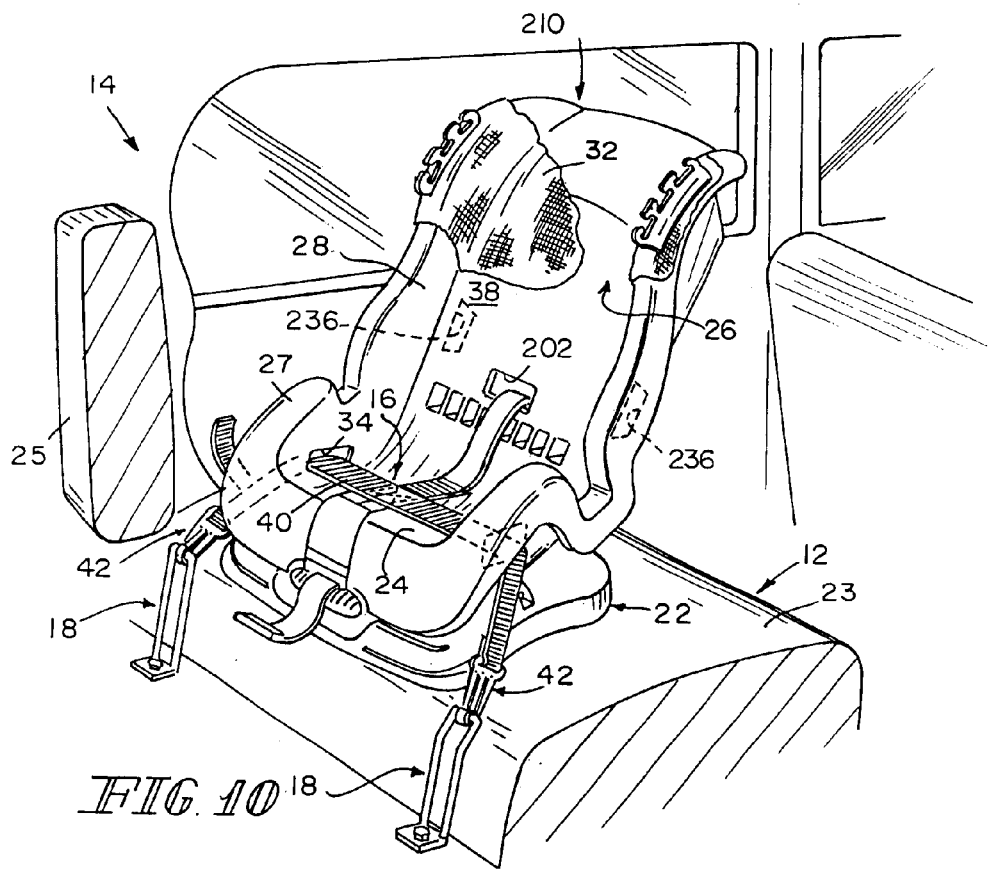
FIG. 10
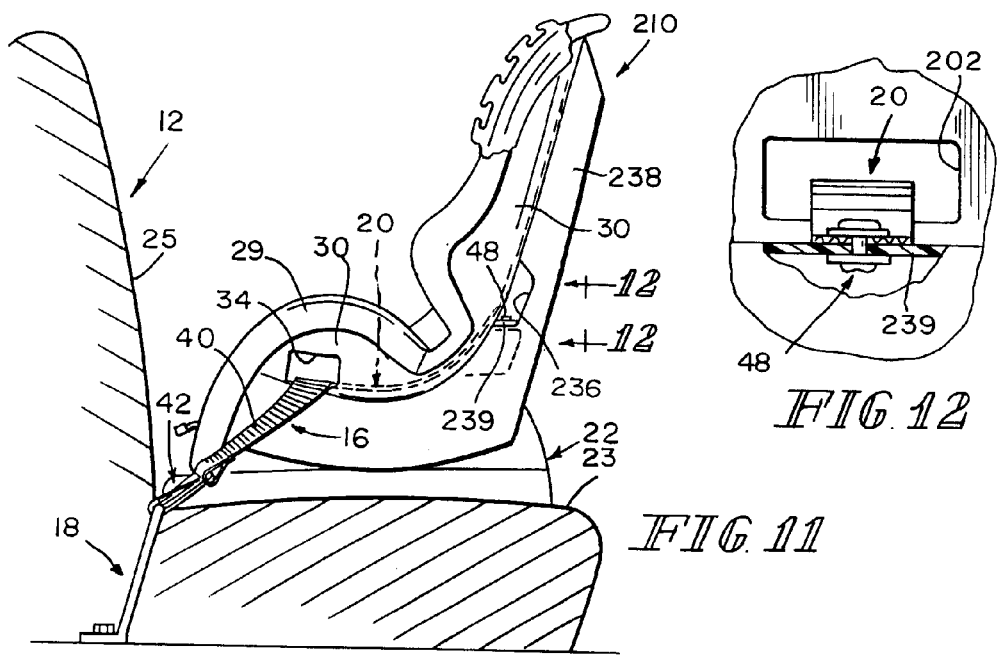
FIG. 11
FIG. 12

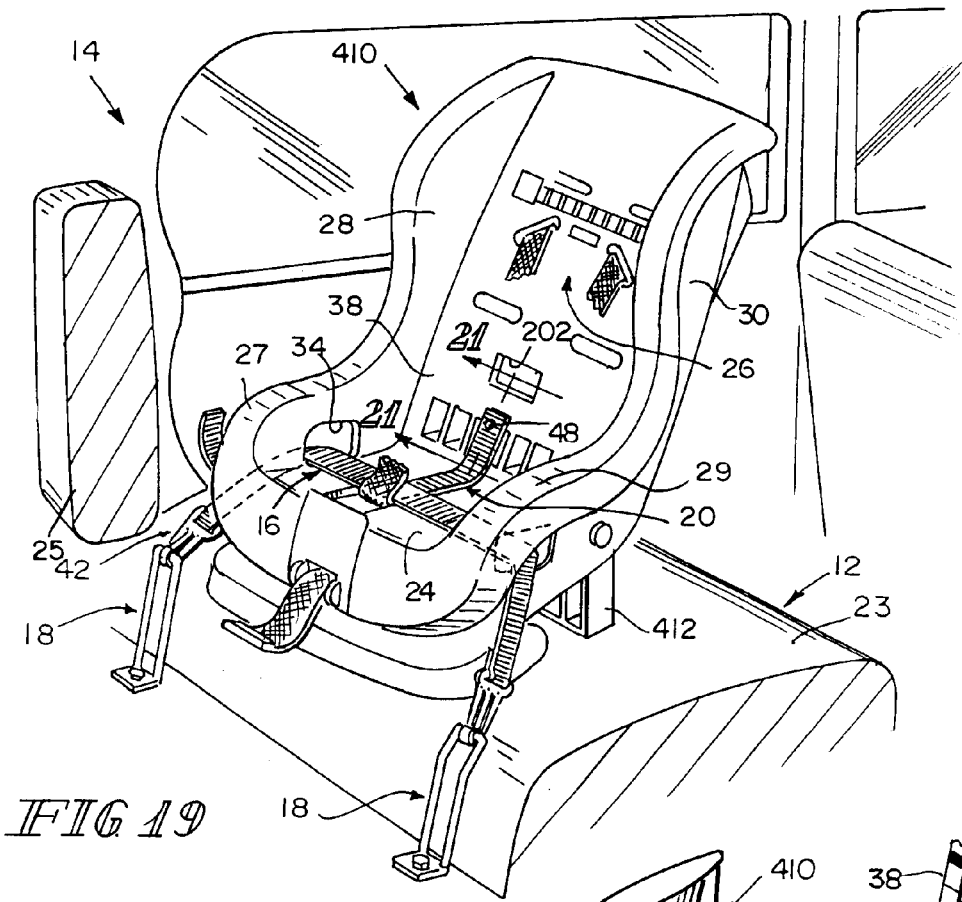
FIG. 19
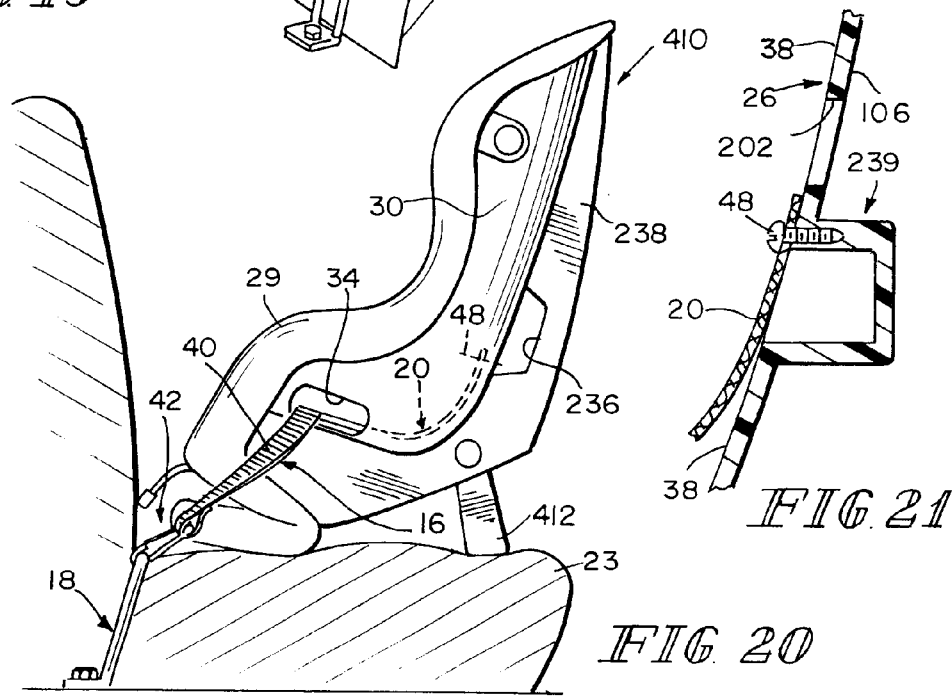
FIG. 20
FIG. 21

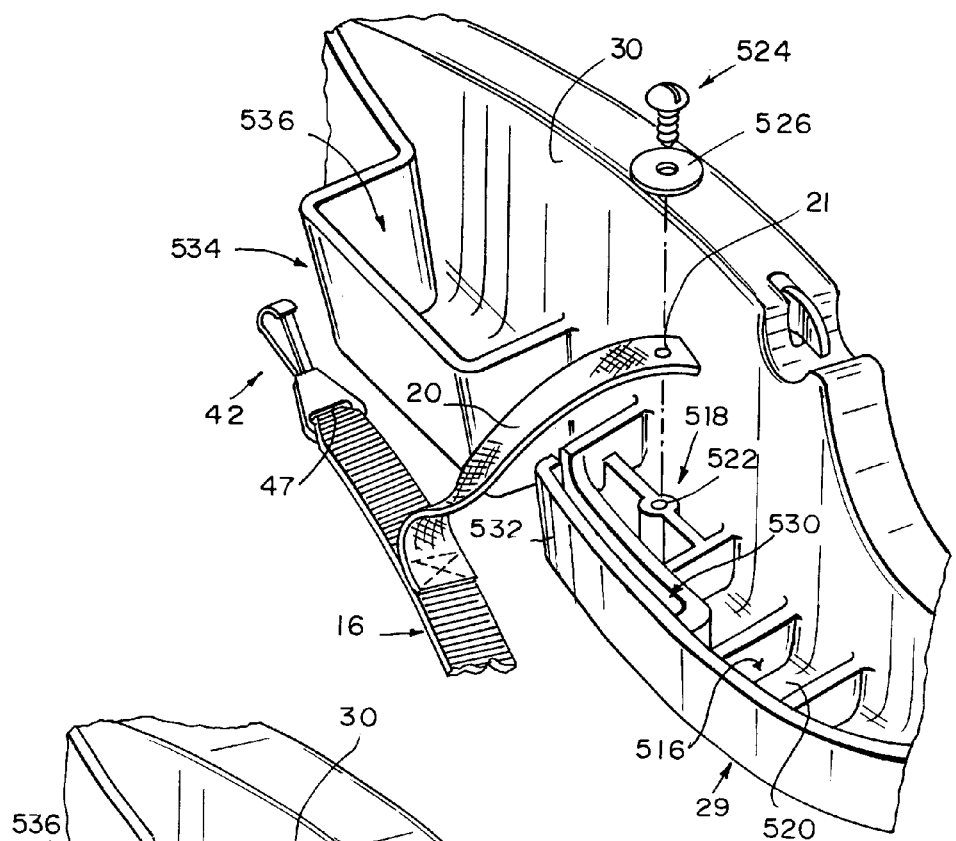
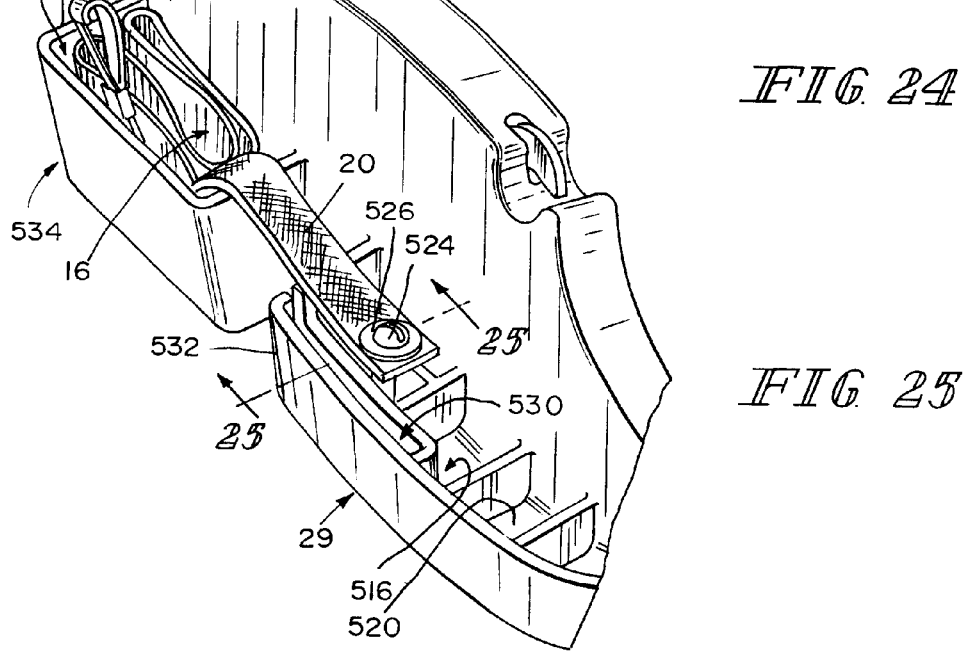
FIG. 24
FIG. 25

US 6,592,183 B2

VEHICLE ANCHOR SYSTEM FOR JUVENILE VEHICLE SEAT

This application claims priority under 35 U.S.C. 119(e) to U.S. Provisional Application Ser. No. 60/269,596 filed Feb. 16, 2001 and to U.S. Provisional Application Ser. No. 60/307,909 filed Jul. 26, 2001, each of which is expressly incorporated by reference herein.

BACKGROUND AND SUMMARY

The present disclosure relates to juvenile vehicle seats, and particularly to a juvenile seat configured to set in an anchored position on a vehicle seat. More particularly, the present disclosure relates to systems for anchoring juvenile seats in a fixed position on a vehicle seat.

Juvenile vehicle seats are used to transport young children in automobiles or other vehicles. Seats for infants are adapted to set on a vehicle seat and face in a rearward direction—while seats for older children are adapted to set on a vehicle seat and face in a forward direction. Convertible vehicle seats are adapted to be used in either rearwardly facing or forwardly facing directions.

U.S. Pat. Nos. 6,000,753 and 5,538,322 disclose apparatus for retaining a child car seat on a vehicle seat, which patents are hereby incorporated by reference herein. See also U.S. application Ser. Nos. 09/614,078; 09/654,622; and 09/751,107, which disclosures are hereby incorporated by reference herein.

In accordance with the present disclosure, a juvenile seat assembly is provided for use with a vehicle passenger seat and anchor mounts provided in or near the vehicle seat. The seat assembly includes a juvenile seat for placement on the passenger seat and a vehicle anchor system coupled to the juvenile seat. The seat includes a seat bottom, a seat back coupled to the seat bottom, and a first and a second side wall each extending from the seat bottom upwardly along opposite edges of the seat back. The anchor system includes an anchor belt to be coupled to the anchor mounts provided in or near the vehicle seat and a leash coupled to the juvenile seat and to the anchor belt. The vehicle anchor system is movable between a first anchored position to anchor the juvenile seat in a rearwardly facing position on the passenger seat and a second anchored position to anchor the juvenile seat in a forwardly facing position on the passenger seat.

In one embodiment the juvenile seat includes first and second openings formed in each side wall for receiving the anchor belt therethrough. The leash is coupled to a front surface of the seat back of the juvenile seat. In another embodiment, the juvenile seat includes an access slot formed in the seat back and the leash is coupled to a rear surface of the seat back. In still another embodiment, the leash is coupled to a horizontal member of the seat back and the second openings are formed in vertical support members which extend from the rear surface of the seat back. In another embodiment, the leash is coupled to either one of the sides of the juvenile seat or to one of the vertical support portions. In another embodiment, the leash is coupled to the front surface of the seat back and the second openings are formed n the vertical mounts. This embodiment also includes the access slot.

The anchor belt of the vehicle anchor system includes a strap having opposite ends and a connector coupled to each end of the strap. Each connector is adapted to be coupled to the anchor mounts. The strap further includes a central portion positioned between each end and the leash is coupled to the central portion of the strap. The anchor belt farther includes an adjuster that is used to adjust a length of the central portion of the strap extending between each connector.

Additional features of the disclosure will become apparent to those skilled in the art upon consideration of the following detailed description of preferred embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a juvenile seat fixed in place on a rear passenger seat bottom in a vehicle by an anchor belt coupled at each end to one of two U-shaped metal anchor mounts bolted to the vehicle floor and arranged to extend upwardly through a space provided between the rear passenger seat bottom and back and showing an anchor belt leash having a front end coupled to the anchor belt and a back end coupled to the seat back of the juvenile seat;

FIG. 2 is a side elevation view of the rearwardly facing juvenile seat of FIG. 1 showing a portion of the anchor belt (in solid) and the leash (in phantom);

FIG. 3 is a sectional view taken along line 3—3 of FIG. 1 showing a connector coupling the back end of the leash to the seat back of the juvenile seat and showing a leash holder fixed to the seat back and formed to include two retainer straps that can be coupled to one another as shown in FIG. 5 using a hook-and-loop fastener to retain a portion of the leash in a retracted position on the seat back and under a seat pad carried on the seat back;

FIG. 7 is a view similar to FIG. 5 showing one end of the leash coupled to a rearwardly facing surface of the seat back in a juvenile seat in accordance with a second embodiment in this disclosure;

FIG. 8 is a side elevation view of the forwardly facing seat of FIG. 7 showing how a retracted portion of the leash forms a loop located along the rear of the juvenile seat and between the juvenile seat and the back of an adjacent passenger seat back in a vehicle;

FIG. 9 is a view similar to FIG. 4 of the juvenile seat shown in FIGS. 7 and 8.

FIGS. 10–15 show a juvenile seat in accordance with a third embodiment of this disclosure;

FIG. 10 is a perspective view similar to FIG. 1 showing a juvenile seat fixed in place on a rear vehicle passenger seat by an anchor belt coupled to one of two U-shaped metal anchor mounts;

FIG. 11 is a side elevation view of the rearwardly facing juvenile seat of FIG. 10 showing a portion of the anchor belt (in solid) and the leash (in phantom);

FIG. 12 is a fragmentary view of a rear portion of the seat back looking in the direction suggested by line 12—12 of FIG. 11, with portions broken away, showing a connector coupling the back end of the leash to a horizontal member of the seat back of the juvenile seat;

FIG. 13 is a view similar to FIG. 4 of the juvenile seat shown in FIGS. 10 and 11;

FIG. 14 is a view similar to FIGS. 5 and 7 showing the juvenile seat fixed in place by coupling the anchor belt, passed through slots in the rear vertical support members (in solid and phantom), to the two anchor mounts.

FIG. 15 is a view similar to FIG. 8 with a side elevation view of the forwardly facing seat of FIG. 14 showing how the anchor belt is passed through a rear vertical support member to couple to one of two U-shaped metal anchor mounts;

FIG. 16 is a perspective view showing movement of the anchor belt into a lower set of slots (to anchor the juvenile seat in a rearwardly facing position as shown in FIGS. 1 and 2) without separation of the anchor belt from the leash that is coupled to the side of a vertical support member;

FIG. 17 is a side elevation view of the forwardly facing juvenile seat with the leash coupled to the side wall and the anchor belt coupled to one of the U-shaped metal anchor mounts;

FIG. 18 is side elevation view similar to FIG. 11 showing one end of the leash coupled to a side wall of a juvenile seat in accordance with a fourth embodiment in this disclosure;

FIGS. 19–21 show a juvenile seat in accordance with a fifth embodiment of this disclosure;

FIG. 19 is a perspective view similar to FIG. 10 showing an alternate juvenile seat fixed in place on a rear vehicle passenger seat by an anchor belt coupled to one of two U-shaped metal anchor mounts and a leash coupled to the anchor belt and to a front surface of the seat back of the juvenile seat;

FIG. 20 is a side elevation view of the rearwardly facing juvenile seat of FIG. 19 showing a portion of the anchor belt (in solid) and the leash (in phantom);

FIG. 21 is a sectional view taken along line 21—21 of FIG. 19 showing a screw coupling the back end of the leash to the front surface of the seat back of the juvenile seat;

FIGS. 22–25 show a juvenile seat in accordance with a sixth embodiment of this disclosure;

FIG. 22 is a perspective view similar to FIGS. 10 and 19 showing an alternate juvenile seat fixed in place in a rearwardly facing position on a rear vehicle passenger seat by an anchor belt coupled to one of two U-shaped metal anchor mounts and a leash coupled to the anchor belt and to an outer rim of one of the side walls, and further showing the anchor belt positioned to lie over the legs of a child sitting in the seat;

FIG. 23 is a sectional view taken along line 23—23 of FIG. 22 showing the leash coupled to the rim by a screw received through the leash and a mount of the rim;

FIG. 24 is a perspective view of a portion of the rim of one of the side walls showing the mount of the rim for receiving the screw to couple the leash to the rim; and FIG. 25 is a perspective view similar to FIG. 24 showing the leash coupled to the rim and also showing a storage compartment of the rim for storing the leash and anchor belt when the leash and anchor belt are not in use.

DETAILED DESCRIPTION OF THE DRAWINGS

Figure 4:
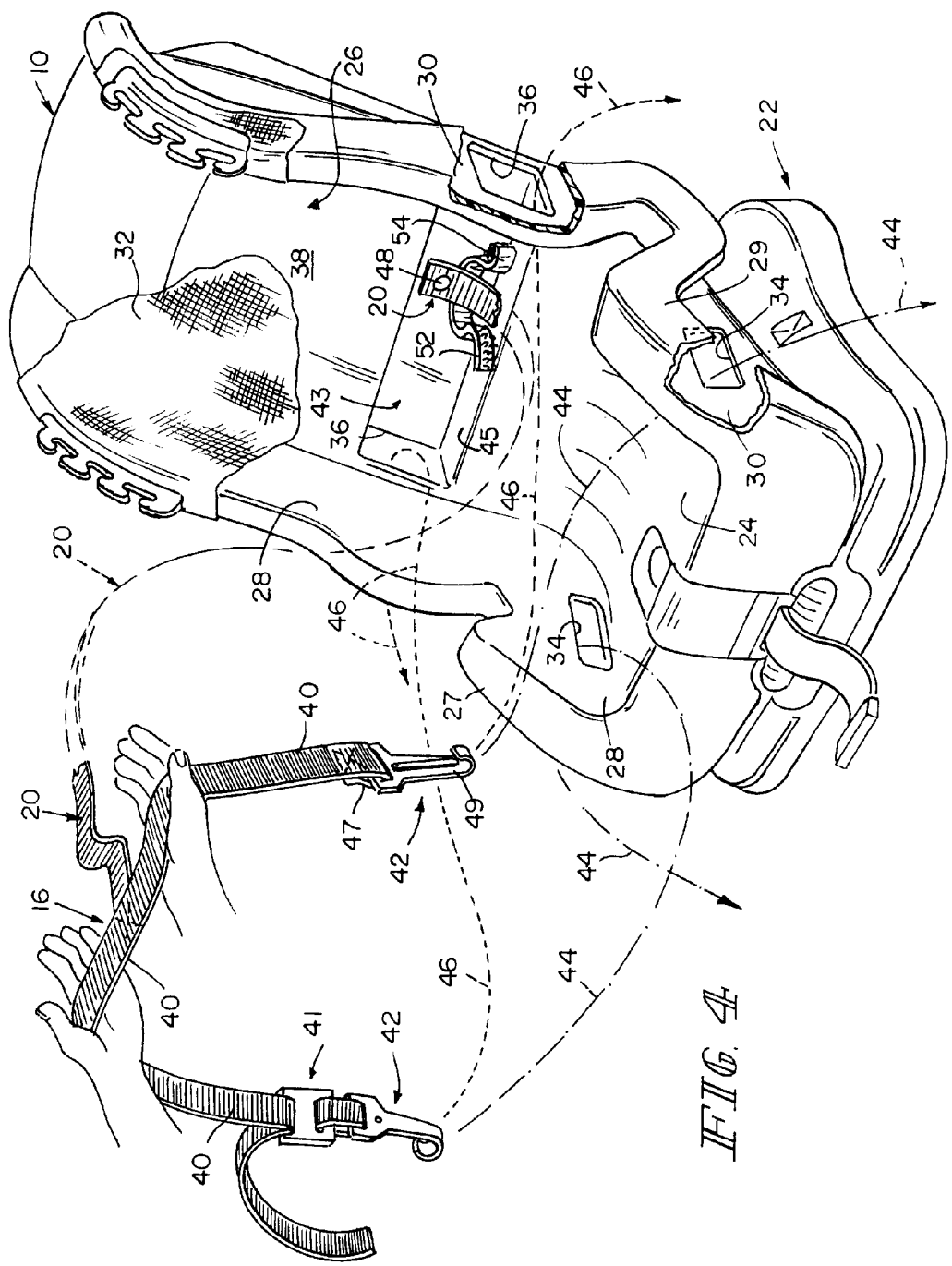
FIG. 4 is a view similar to FIG. 1 showing movement of the anchor belt into either a lower set of slots (to anchor the juvenile seat in a rearwardly facing position as shown in FIGS. 1 and 2) or an upper set of slots (to anchor the juvenile seat in a forwardly facing position as shown in FIGS. 5 and 6) without separation of the anchor belt from the leash that is coupled to the seat back.

A juvenile seat assembly is provided for use with a vehicle passenger seat. The assembly includes a juvenile seat for placement on the passenger seat and a vehicle anchor system coupled to the juvenile seat. The vehicle anchor system includes an anchor belt to be coupled to a pair of anchor mounts provided in or near the vehicle seat. The vehicle anchor system also includes a leash coupled to the juvenile seat and to the anchor belt. The system moves between a first anchored position to anchor the juvenile seat in a rearwardly facing position on the passenger seat and a second anchored position to anchor the juvenile seat in a forwardly facing position on the passenger seat.

In one embodiment, shown in FIGS. 1–6, juvenile seat includes first and second openings formed in each side wall for receiving the anchor belt therethrough. The leash is coupled to a front surface of a seat back of the juvenile seat. In another embodiment, shown in FIGS. 7–9, the juvenile seat includes an access slot formed in the seat back and the leash is coupled to a rear surface of the seat back. In still another embodiment, shown in FIGS. 10–15, the leash is coupled to a horizontal member of the seat back and the second openings are formed in vertical support members which extend from the rear surface of the seat back. In another embodiment, shown in FIGS. 16–18, the leash is coupled to either one of the sides of the juvenile seat or to one of the vertical support members. In yet another embodiment, shown in FIGS. 19–20, the leash is coupled to the front surface of the seat back and the second openings are formed in the vertical mounts. This embodiment also includes the access slot.

Referring now to the embodiment shown in FIGS. 1–6, juvenile seat 10 is held in place on a passenger seat 12 in a vehicle 14 by an anchor belt 16 coupled to juvenile seat 10 and to each of two anchor mounts 18 provided in vehicle 14. An anchor belt leash 20 is coupled to anchor belt 16 and to juvenile seat 10. Without separating anchor belt 16 from leash 20, anchor belt 16 can be moved (at the option of a user) relative to juvenile seat 10 between a first anchored position anchoring juvenile seat 10 in rearwardly facing position on passenger seat 12 as shown, for example, in FIGS. 1 and 2 and a second anchored position anchoring juvenile seat 10 in a forwardly facing position on passenger seat 12 as shown, for example, in FIGS. 5 and 6.

Leash 20 is well-suited for use with "convertible" juvenile seats such as seat 10 (i.e., a seat that is adapted to be mounted in either one of a rearwardly facing position or a forwardly facing position on a passenger seat). It is within the scope of this disclosure to couple an anchor belt leash to a "non-convertible" juvenile seat to cause an anchor belt to be permanently coupled to the juvenile seat and readily available to a user.

Juvenile seat 10 includes a base 22 adapted to set on bench 23 (or other surface) of passenger seat 12, a seat bottom 24 above base 22, and a seat back 26 as shown in FIG. 1. Seat 10 also includes a first side wall 28 extending from seat bottom 24 upwardly along one edge of seat back 26 and a second side wall 30 extending from seat bottom 24 upwardly along an opposite edge of seat back 26. A seat pad 32 is mounted on seat 10 to cover portions of seat bottom 24 and seat back 26. It is within the scope of this disclosure to provide a shell made of a plastics material and formed to include seat bottom 24, seat back 26, and side walls 28, 30 or to provide those components using any suitable structure(s).

Juvenile seat 10 is formed to include rearward anchor means for receiving anchor belt 16 in the first anchored position to cause anchor belt 16 to be coupled to juvenile seat 10 when juvenile seat 10 occupies a rearwardly facing position on passenger seat 12 as shown in FIGS. 1 and 2 so that anchor belt 16 can be coupled to anchor mounts 18 to retain juvenile seat 10 in a fixed position on passenger seat bench 23. In an illustrated embodiment, each side wall 28, 30 is formed to include a lower opening or slot 34 as shown in FIGS. 1, 2, and 4–6 to establish the rearward anchor means. It is within the scope of this disclosure to provide one or more belt receivers (in lieu of slots 34) in or on juvenile seat 10 to receive, hold, or restrain anchor belt 16 in its first anchored position.

Figure 5:
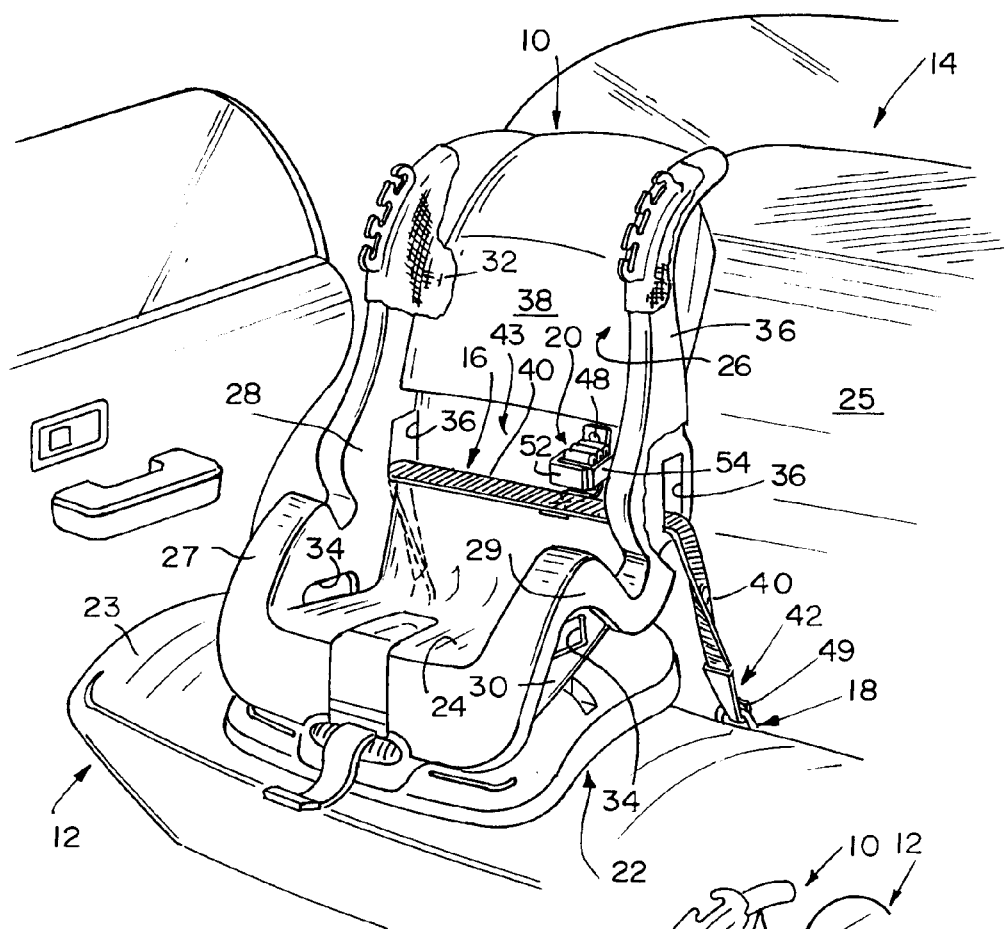
FIG. 5 is a view similar to FIG. 1 after the juvenile seat has been moved (i.e., turned around) by a user to assume a forwardly facing position on the rear passenger seat and fixed in place by coupling the anchor belt to the two anchor mounts and showing the leash retained by the retainer straps in its retracted position of the seat back under the seat pad.
Figure 6:
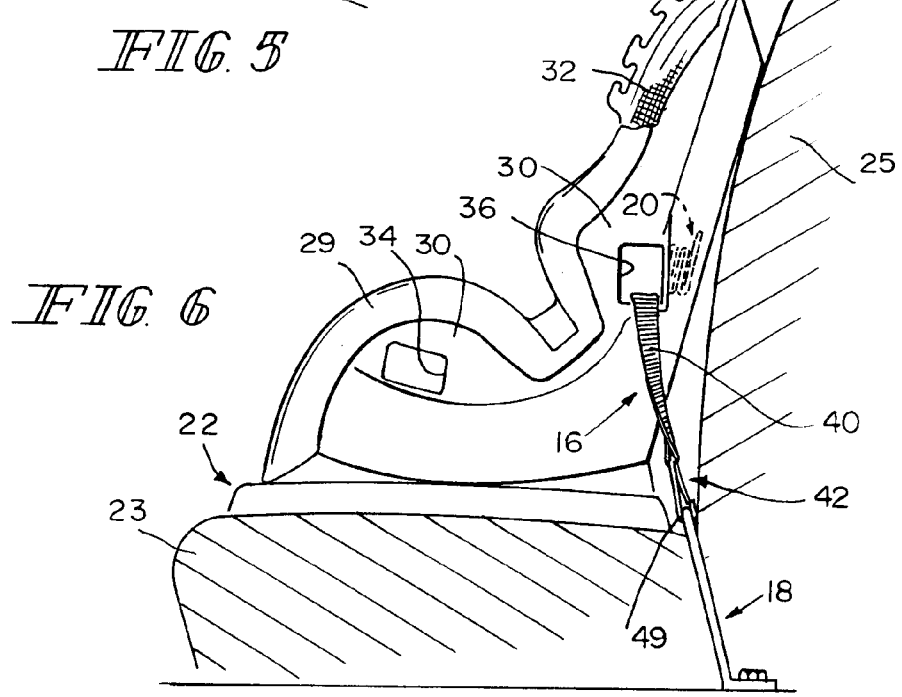
FIG. 6 is a side elevation view of the forwardly facing seat of FIG. 5 showing a portion of the anchor belt (in solid) and the retracted leash (in phantom)

Juvenile seat 10 is also formed to include forward anchor means for receiving anchor belt 16 in the second anchored position to cause anchor belt 16 to be coupled to juvenile seat 10 when juvenile seat 10 occupies a forwardly facing position on passenger seat 12 as shown in FIGS. 5 and 6 so that anchor belt 16 can be coupled to anchor mounts 18 to retain juvenile seat 10 in a fixed position on passenger seat bench 23. In an illustrated embodiment, each side wall 28, 30 is formed to include an upper opening or slot 36 as shown in FIGS. 1, 2, and 4–6 to establish the forward anchor means. It is also within the scope of this disclosure to provide one or more belt receivers (in lieu of slots 36) in or on juvenile seat 10 to receive, hold, or restrain anchor belt 16 in its second anchored position.

As shown, for example, in FIGS. 1, 2, and 4, the first pair of slots 34 is formed to lie on either side of and above seat bottom 24 (near a front edge of seat bottom 24) and below fender-like rims 27, 29 appended to side walls 28, 30. The second pair of slots 36 is formed to lie on either side of a front 38 of seat back 26 and above seat bottom 24. Each of slots 34, 36 has an oblong or rectangular border and is sized to permit a portion of anchor belt 16 to be passed or threaded therethrough.

Anchor mounts 18 are provided by the manufacturer of vehicle 14 or other aftermarket supplier and can take any suitable form. In the illustrated embodiment, each anchor mount includes an elongated U-shaped rod and a base coupled to the rod and fixed to a floor or other part of vehicle 14. The bight portion of the U-shaped rod is arranged to extend upwardly through a space provided between a rear end of passenger seat bench 23 and a lower portion of a passenger seat back 25 included in vehicle seat 12. Anchor mounts 18 are aligned in spaced-apart relation to one another so that anchor belt 16 can be coupled to juvenile seat 10 and to each anchor mount whether anchor belt 16 is received in its first anchored position or its second anchored position on juvenile seat 10.

Anchor belt 16 includes a strap 40 having opposite ends and a clasp 42 or other suitable connector on or near each end of strap 40. Each clasp 42 is configured to be coupled to one of anchor mounts 18 as shown, for example, in FIGS. 1 and 2. Each clasp 42 includes a slot 47 for receiving strap 40 therethrough and a hook 49 adapted to couple with one of the anchor mounts. Strap 40 is made of any suitable seat belt or harness restraint material. The anchor belt further includes an adjuster 41, as shown in FIG. 4. The adjuster 41 is used to adjust a length of a central portion of strap 40 positioned between clasps 42.

Leash 20 is coupled to the central portion of strap 40 at one end and to seat back 26 at an opposite end as shown in FIGS. 1 and 2. Anchor belt 16 can be moved between its first and second anchored positions without separating anchor belt 16 from leash 20 as suggested in FIG. 4.

To establish the first anchored position of anchor belt 16 as shown in FIGS. 1 and 2, a user passes each clasp 42 through one of the lower slots 34 formed in side walls 28, 30 (as suggested by lines 44 in FIG. 4) and couples each clasp 42 to one of anchor mounts 18. Once installed as shown in FIG. 1, the central portion of strap 40 and leash 20 lie under the removable seat pad 32 covering seat bottom 20 and other portions of juvenile seat 10. Removing a portion of seat pad 32 exposes anchor belt 16 so that anchor belt 16 can be moved between its first and second anchored positions.

To establish the second anchored position of anchor belt 16 shown in FIGS. 5 and 6, a user passes each clasp 42 through one of the upper slots 36 formed in side walls 28, 30 (as suggested by lines 46 in FIG. 4) and couples each clasp 42 to one of anchor mounts 18. Such movement of anchor belt 16 between its first and second anchored positions is accomplished without separating anchor belt 16 from leash 20. As shown in FIG. 4, seat back 26 includes a recessed portion 43 formed in the front surface 38. Recessed portion 43 defines a lower ledge 45 and anchor belt 16 engages ledge 45 when anchor belt 16 is in the second anchor position.

One end of leash 20 is coupled to front surface 38 of seat back 26 using a coupler or connector 48 as shown, for example, in FIGS. 1, 3, and 4. It is within the scope of this disclosure to couple the leash to other portions of juvenile seat 10 as will be discussed in more detail below. Illustrative connector 48 is a rivet.

Leash 20 is unfolded to assume an extended position as shown in FIGS. 1 and 2 whenever anchor belt 16 is moved to its first anchored position. Leash 20 is then folded as shown, for example, to assume a gathered or retracted position as shown in FIGS. 5 and 6 whenever anchor belt 16 is moved to its second anchored position.

A leash holder 50 is provided to retain folded leash 20 in its retracted position as shown in FIGS. 5 and 6. Leash holder 50 includes first and second retainer straps 52, 54 coupled to seat back 26 using connector 48 or other suitable means and a hook-and-loop fastener 56, 58 or other suitable fastener provided on free ends of first and second retainer straps 52, 54. Retainer straps 52, 54 are coupled to one another using hook-and-loop fastener 56, 58 to retain a folded portion of leash 20 in a retracted position on seat back 26 and under removable seat pad 32.

Figure 7:
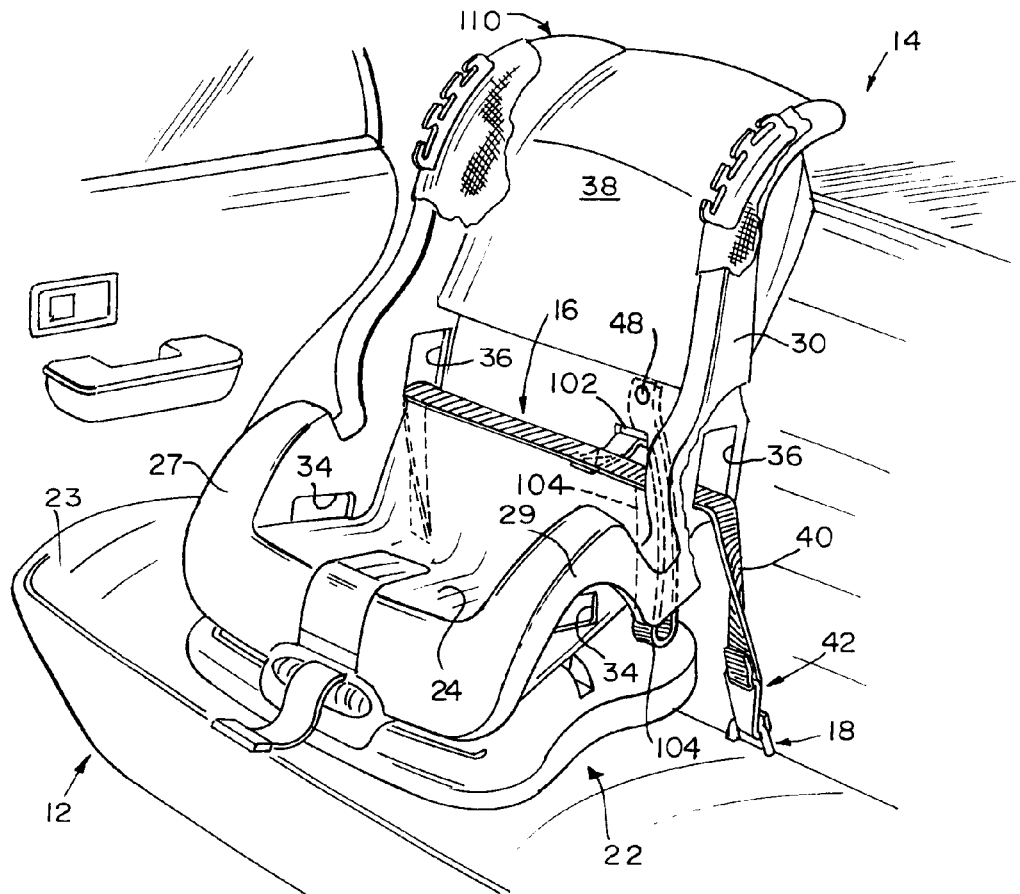
FIGS. 7–9 show a juvenile seat in accordance with a second embodiment of this disclosure.
Figure 8:
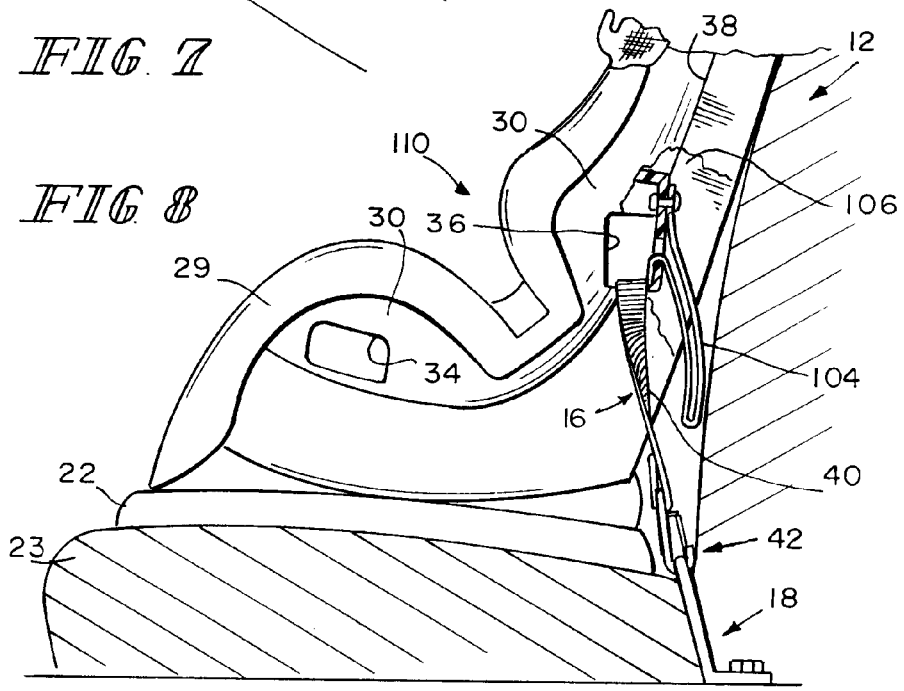
Figure 9:
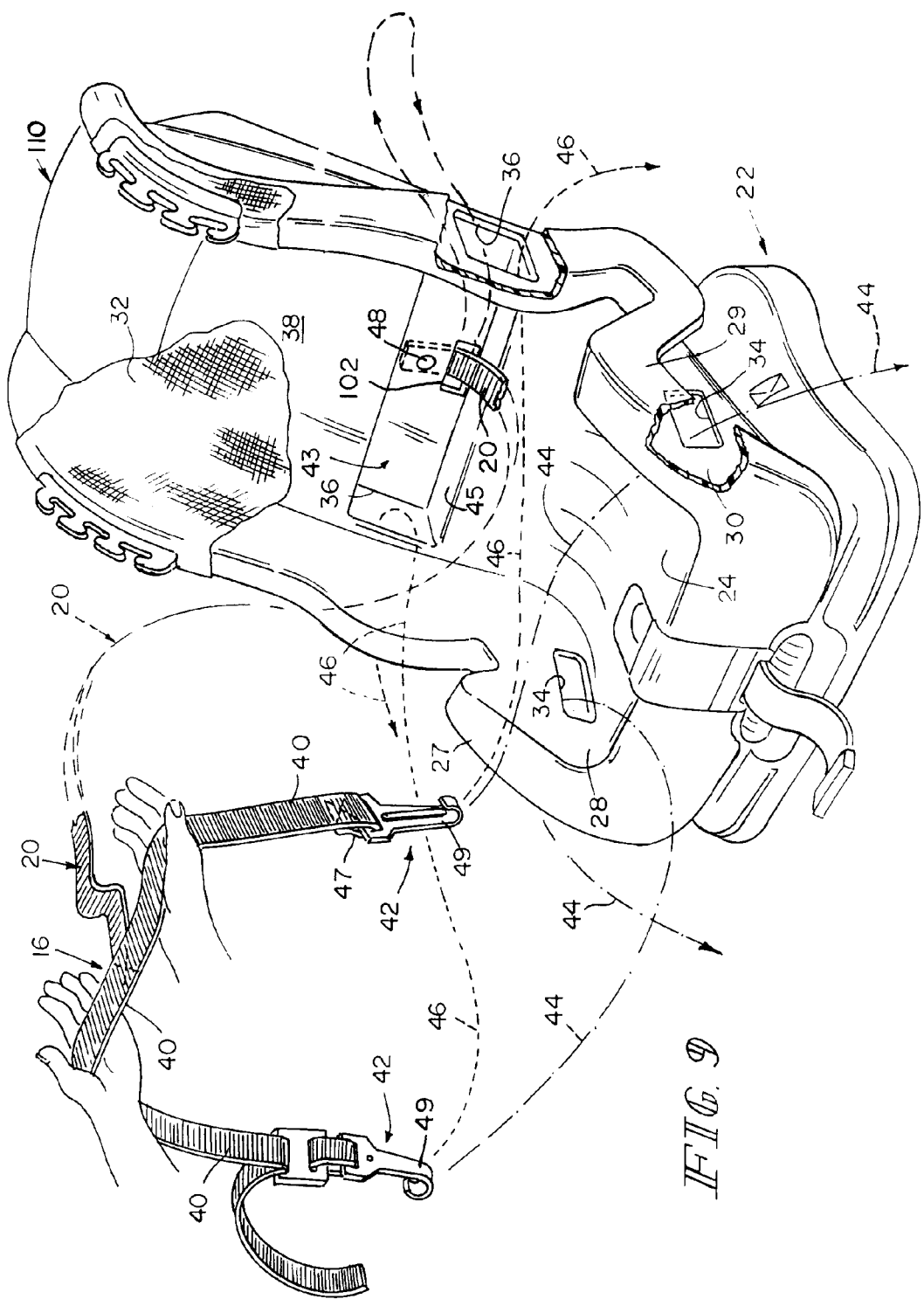

Referring now to FIGS. 7 through 9, there is shown another exemplary embodiment of a vehicle anchor system for a juvenile vehicle seat (hereinafter designated with reference numeral 110). Juvenile seat 110 is somewhat similar to juvenile seat 10. As such, the same reference numerals have been used in FIGS. 7 through 9 to designate similar components to those components previously discussed in regard to FIGS. 4, 5, and 6, and additional discussion thereof is not warranted. One difference between juvenile seat 10 and juvenile seat 110 is that juvenile seat 110 includes access slot 102 within seat back 26.

Access slot 102 is molded into seat back 26 and is adjacent to the horizontal belt path of anchor belt 16 when belt 16 is in the second anchored position. Leash 20 is threaded through this access slot 102. The retracted portion of leash 20 forms a loop 104 adjacent to a rear surface 106 of the seat back 26 allowing storage of the unused portion of leash 20 whenever anchor belt 16 is moved to its second anchored position.

One end of leash 20 is coupled to rear surface 106 of seat back 26 using connector 48 as shown, for example, in FIGS. 7 and 9. It is within the scope of this disclosure to couple leash 20 to other portions of juvenile seat 10.

Referring now to FIGS. 10 through 15, there is shown another exemplary embodiment of a vehicle anchor system for a juvenile vehicle seat (hereinafter designated with reference numeral 210). Juvenile seat 210 is somewhat similar to juvenile seat 10. As such, the same reference numerals have been used in FIGS. 10 through 15 to designate similar components to those components previously discussed in regard to FIGS. 1 through 6, and additional discussion thereof is not warranted.

One difference between juvenile seat 10 and juvenile seat 210 is that juvenile seat 210 uses an existing vertical support member 238, which is formed to include an upper slot 236 as shown in FIGS. 10, 11, and 13–15 to establish the forward anchor means. Vertical support member 238 is formed to rear surface 106 of seat 26. Seat 210 also includes an upper attachment access slot 202 which is molded into seat back 26. Thus, slots 236 are situated to the rear of seat back 26 whereas slots 36 of seat assemblies 10, 110 are situated in front of seat back 26.

Figure 13:
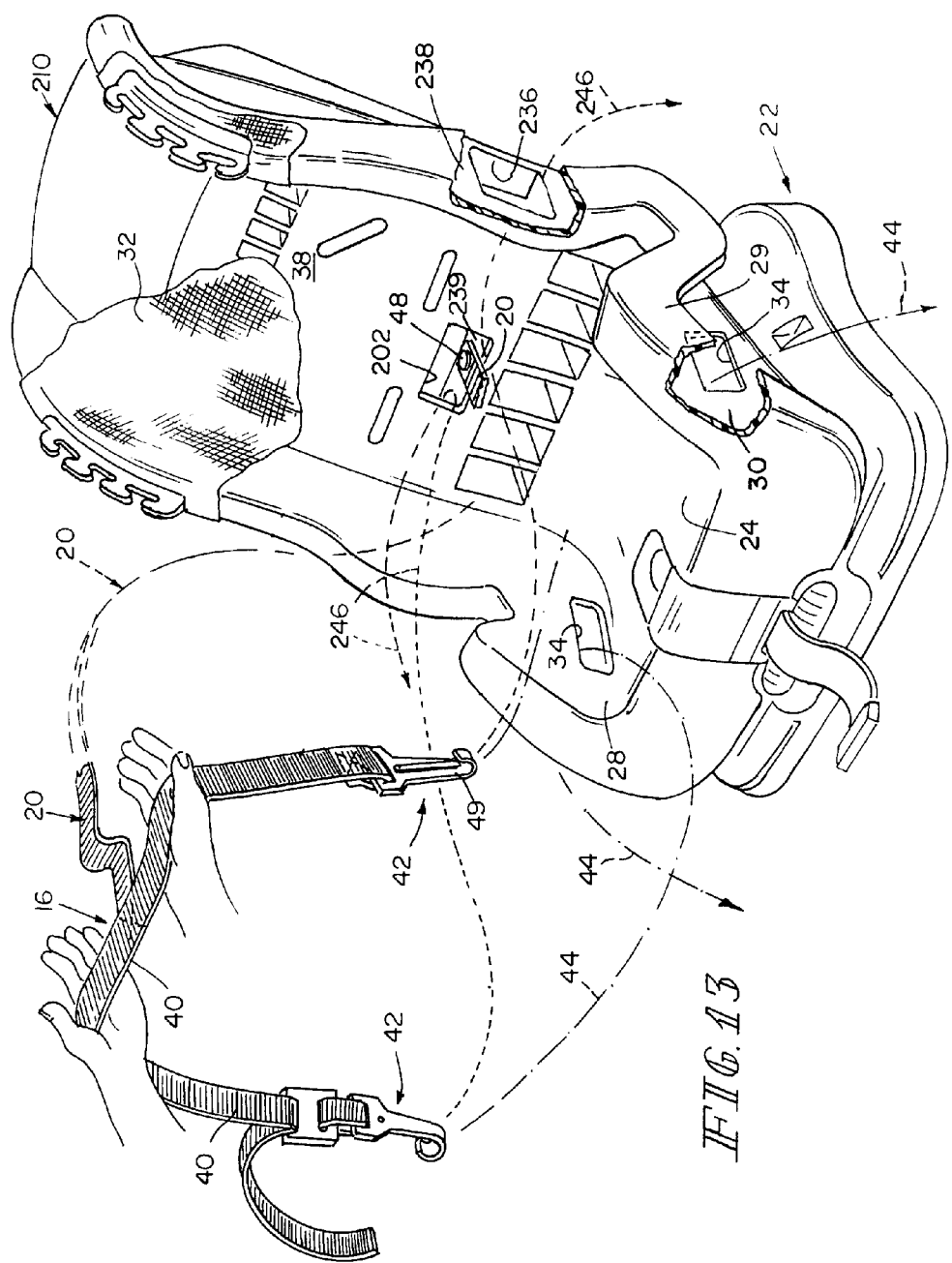
Figure 14:
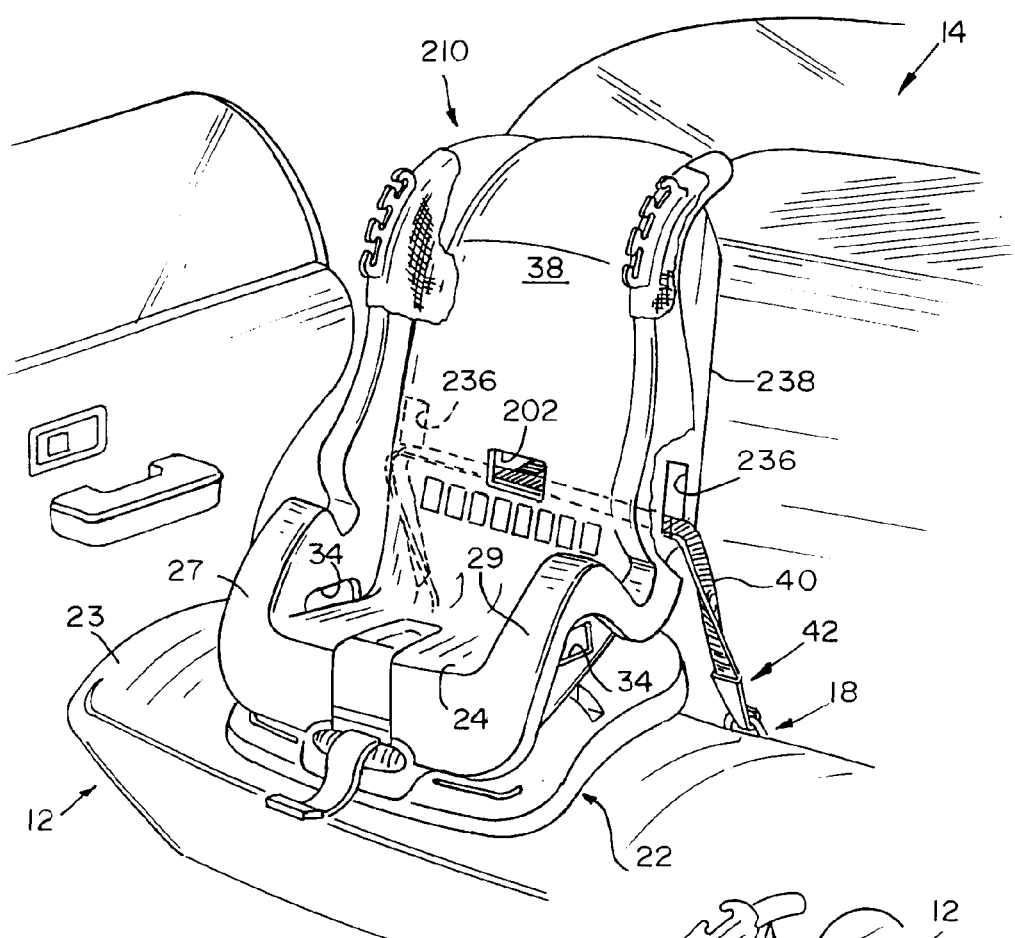
Figure 15:
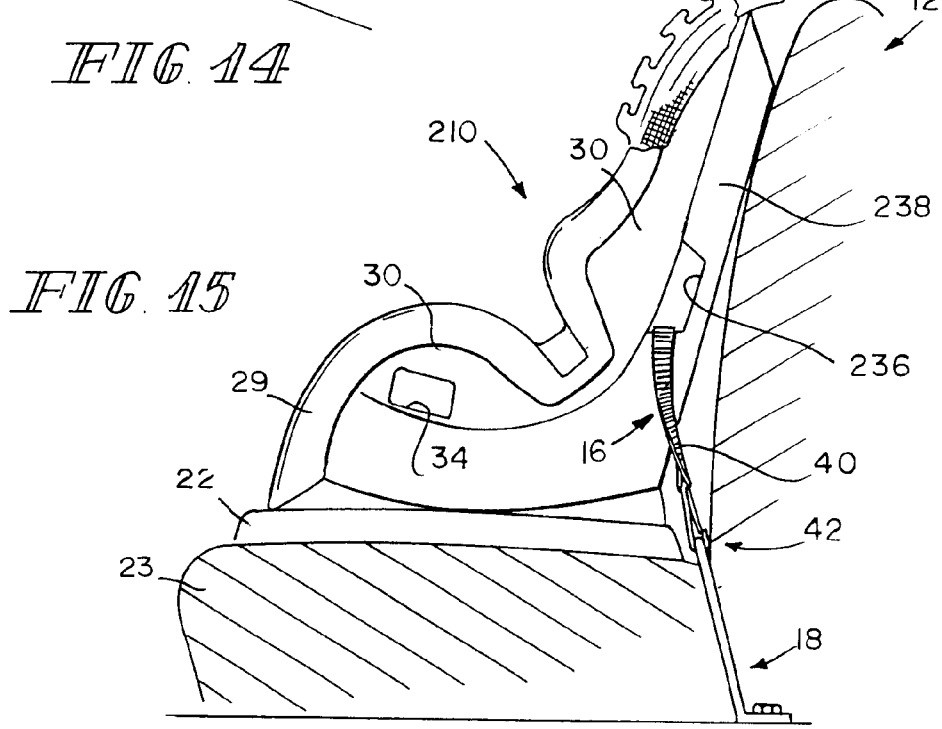

Upper attachment access slot 202 permits a user to establish the second anchored position of anchor belt 16 shown in FIGS. 14 and 15. Passing clasp 42 through upper attachment access slot 202, and through one of upper slots 236 formed in vertical support member 238 (as suggested by lines 246 in FIG. 13), permits coupling of each clasp 42 to one of anchor mounts 18. Such movement of anchor belt 16 between its first and second anchored positions can be accomplished without separating anchor belt 16 from leash 20.

One end of leash 20 is coupled to the upper surface of a horizontal support member 239 using connector 48 as shown, for example, in FIGS. 11–13. Horizontal support member 239 is formed on the rear surface 106 of seat back 26.

Figure 16:
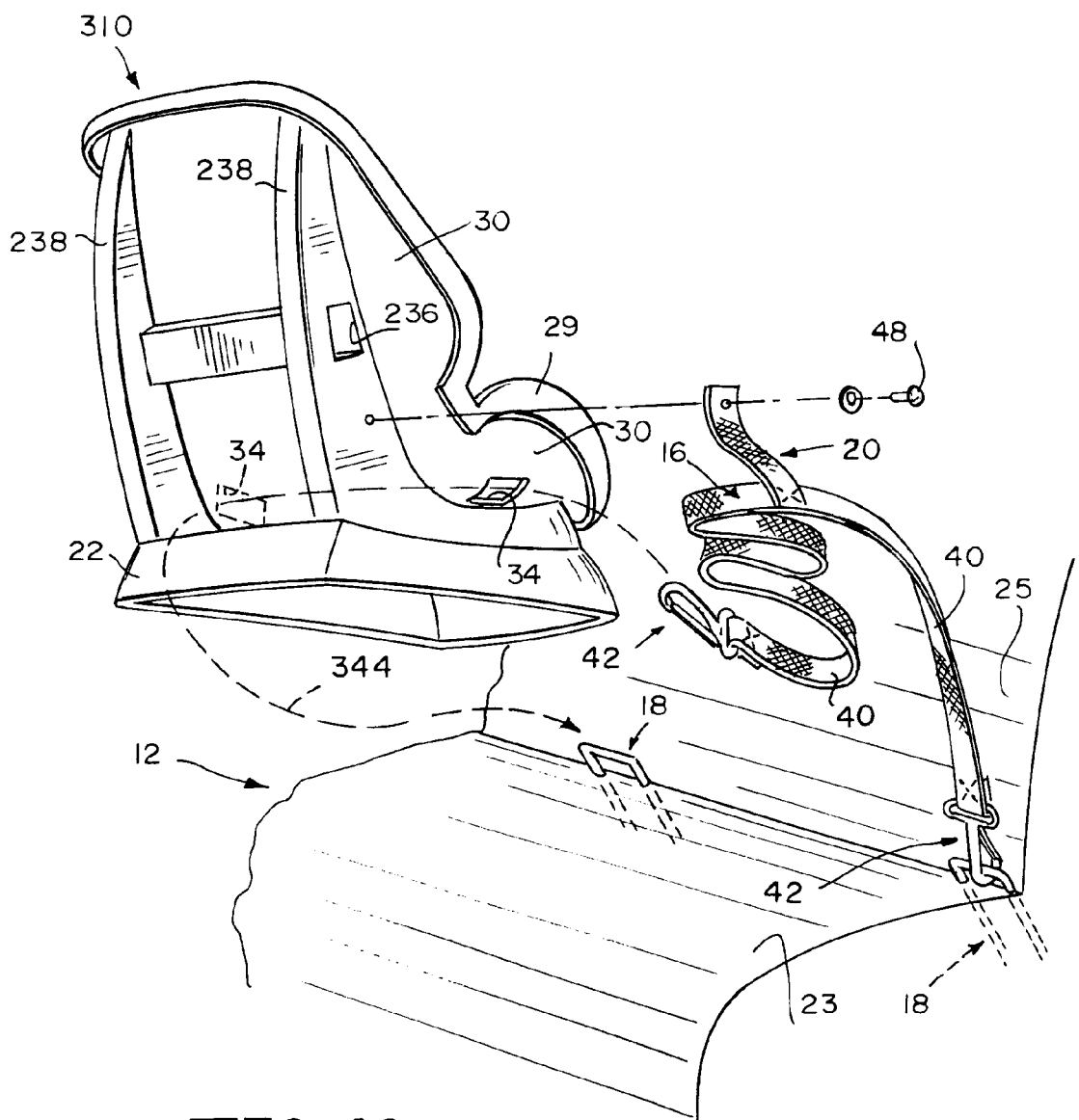
FIGS. 16–18 show a juvenile seat in accordance with a fourth embodiment of this disclosure.
Figure 17:
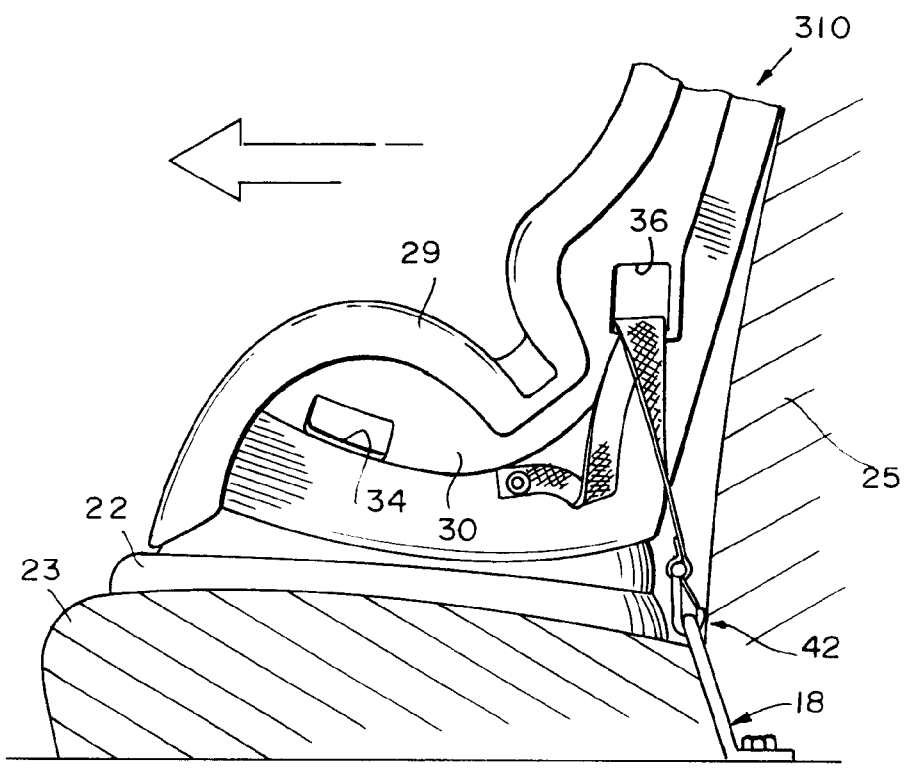
Figure 18:
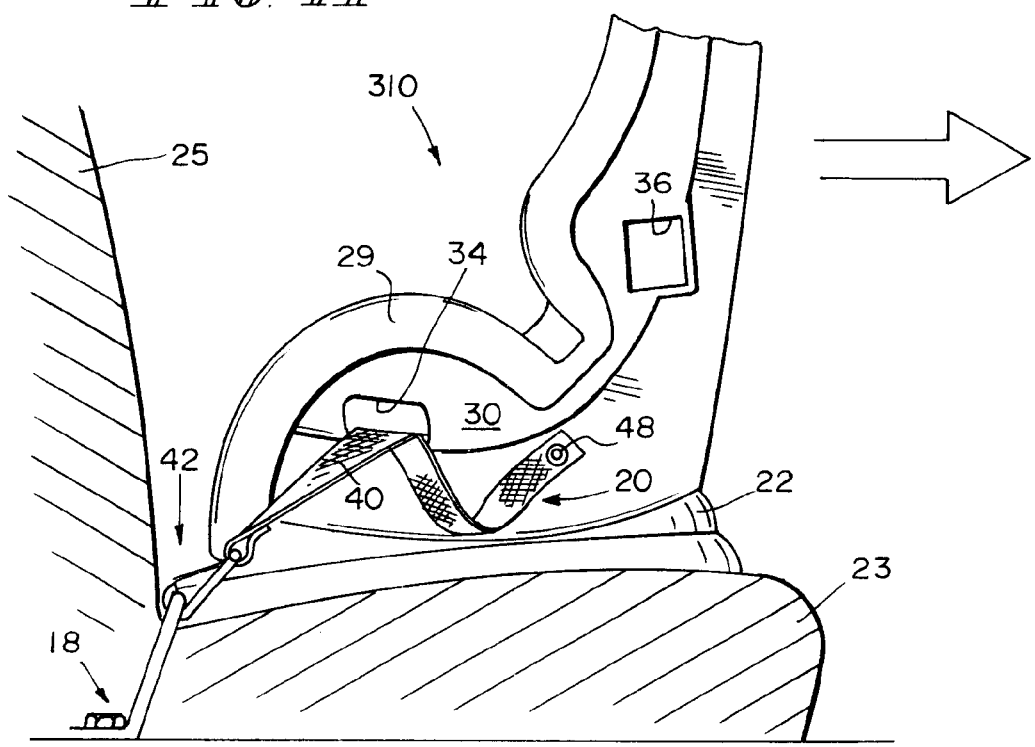

Referring now to FIGS. 16 through 18, there is shown another exemplary embodiment of a vehicle anchor system for a juvenile seat (hereinafter designated with reference numeral 310). Juvenile seat 310 is somewhat similar to juvenile seats 10, 110, and 210. As such, the same reference numerals have been used in FIGS. 16 through 18 to designate similar components to those components previously discussed in regards to FIGS. 1–15, and additional discussion thereof is not warranted.

A difference between juvenile seat 10 and juvenile seat 310 is that juvenile seat 310 has leash 20 coupled to the side of vertical support member 238, as shown in FIG. 16, or to side wall 30 as shown in FIGS. 17 and 18. To establish the first anchored position of anchor belt 16, as shown in FIGS. 16 and 18, a user passes clasp 42 through lower slots 34 (as suggested by lines 344 in FIG. 16) and couples each clasp 42 to one of anchor mounts 18. Anchor leash 20 remains coupled to the outboard side of juvenile seat 310.

To establish the second anchored position of juvenile seat 310 shown in FIG. 17, a user passes clasp 42 through upper slots 36, and couples clasp 42 to one of anchor mounts 18. Anchor leash 20 remains coupled to the outboard side of juvenile seat 310.

Referring now to FIGS. 19 through 21, there is shown yet another exemplary embodiment of a vehicle anchor system for a juvenile vehicle seat (hereinafter designated with reference numeral 410). Juvenile seat 410 is similar to juvenile seats 10 and 210. As such, the same reference numerals have been used in FIGS. 19 through 21 to designate similar components to those components previously discussed in regard to FIGS. 1 through 6 and FIGS. 10 through 15, and additional discussion thereof is not warranted.

One difference between juvenile seat 210 and juvenile seat 410 is the structure or appearance of juvenile seat 410. For example, juvenile seat 410 does not include base 22 of juvenile seats 10 or 210. Rather, a support arm 412 is provided to support juvenile seat 410 upon passenger seat 12. Another difference is the means by which leash 20 is coupled to juvenile seat 410. As shown in FIGS. 19 and 21, leash 20 is coupled to the front surface 38 of seat back 26 of juvenile seat 410. As further shown in FIG. 21, the connector 48 is a screw positioned through front surface 38 to also couple leash 20 to horizontal support member 239. Because leash 20 is coupled to front surface 38 of juvenile seat 410 leash 20 is not received through access slot 202 when anchor belt 16 is in the first anchored position shown in FIGS. 19 and 21. However, leash 20 is received through access slot 202 when anchor belt 16 is in the second anchored position.

Referring now to FIGS. 22 through 25, there is shown yet another exemplary embodiment of a vehicle anchor system for a juvenile vehicle seat (hereinafter designated with reference numeral 510). Juvenile seat 510 is similar to juvenile seats 10, 210, 310 and 410. As such, the same reference numerals have been used in FIGS. 22 through 25 to designate similar components to those components previously discussed in regard to FIGS. 1–21, and additional discussion thereof is not warranted.

Figure 23:
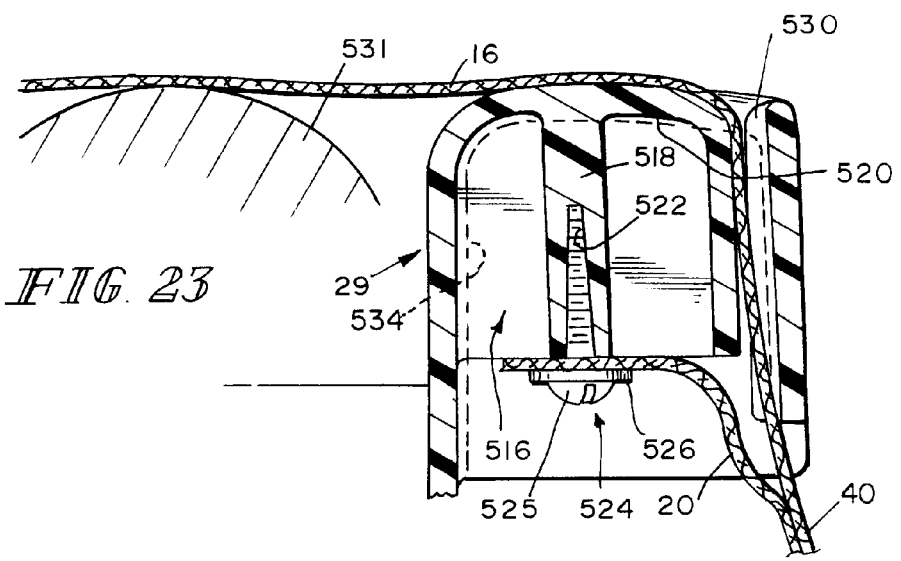

One difference between the previous embodiments and seat 510 is that the leash 20 is coupled to either one of the fender-like rims 27, 29 appended to side walls 28, 30. As shown in FIGS. 23–25, leash 20 is coupled to rim 29, which is coupled to side wall 30 of seat 510. It is within the scope of this disclosure, however, for leash 20 to be coupled to either rim 27 or rim 29. As such, the structure of each rim 27, 29 is generally the same to enable leash 20 to be coupled to either rim 27 or rim 29.

Each rim 27, 29 is generally U-shaped and forms a cavity 516, as shown in FIGS. 23–25. Each rim 27, 29 further includes a mount 518 coupled to an inner surface 520 of cavity 516. Each mount 518 includes an aperture 522 for receiving a bolt or screw 524. As shown in FIG. 24, leash 20 includes an aperture 21 for receiving screw 524 therethrough to couple leash 20 to an underside of rim 29. As shown in FIGS. 23–25, a washer 526 is provided between leash 20 and screw head 525. In the embodiment shown in FIGS. 22–25, screw 524 acts as connector 48 shown in prior embodiments. It is within the scope of this disclosure for leash 20 to be coupled to either rim 27, 29 of seat 510 using any type of suitable connecter such as a rivet or bolt, for example.

Figure 22:
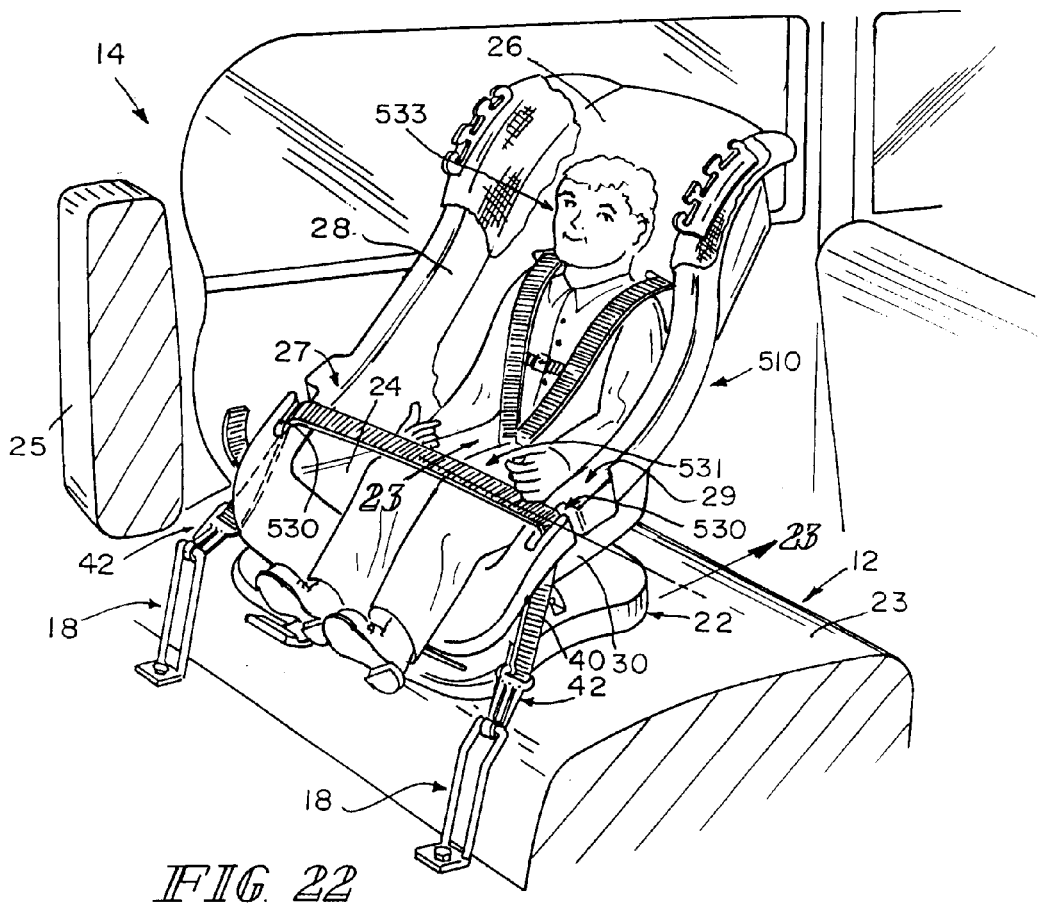

Each rim 27, 29 of seat 510 further includes an open-ended slot 530 defined by an outer arm portion 532 of each rim 27, 29, as shown in FIGS. 23 and 24. In use, anchor belt 16 is slid into each slot 530 to position anchor belt 16 adjacent to and over the legs and/or waist area 531 of a child or infant 533 sitting in seat 510. As shown in FIG. 22, anchor belt 16 and leash 20 of seat 510 are used to retain seat 510 in the rearwardly facing position. It is also within the scope of this disclosure for seat 510 to be retained by anchor belt 16 and leash 20 in the forwardly facing position as well.

Each rim 27, 29 of seat 510 further includes a storage compartment 534 shown in FIGS. 24 and 25. Storage compartment 534, cooperates with each corresponding side wall 28, 30 to define a storage cavity 536. Compartment 534 is provided for storing anchor belt 16, clasps 42 coupled at each end of anchor belt 16, and a portion of leash 20 when the vehicle anchor system is not in use. Leash 20 remains coupled to rim 27, 29 while anchor belt 16 is being stored within compartment 534.

An anchor belt leash as disclosed herein is also usable with infant vehicle seats and toddler (high back booster) seats. Such a leash can be permanently coupled to child restraint harnesses or belts included in or associated with such seats. This leash makes such harnesses or belts easier to store on the particular seats while still keeping the harnesses and belts permanently coupled to the seats and readily available to the user.

Although this invention has been described in detail with reference to certain embodiments, variations and modifications exist within the scope and spirit of the invention as described and defined in the following claims.

What is claimed is:

1. A juvenile seat assembly is provided for use with both a vehicle seat and anchor mounts provided near the vehicle seat, the assembly comprising
   a juvenile seat having a first pair of openings and a second pair of openings, the seat being adapted for mounting on the vehicle seat in a first, rearwardly facing position and a second, forwardly facing position distinct from the first, rearwardly facing position,
   an anchor belt including a strap having a central portion and opposite end portions, and a connector coupled to each end portion and adapted to be coupled to one of the anchor mounts, the anchor belt being threaded through the first openings when the seat is mounted in the first, rearwardly facing position and the anchor belt being threaded through the second openings when the seat is mounted in the second, forwardly facing position, and
   a leash coupled to the juvenile seat and to the central portion of the anchor belt, the leash remaining coupled to the seat and to the anchor belt when the anchor belt is moved between the first opening when the seat is mounted in the first, rearwardly facing position and the second opening when the seat is mounted in the second, forwardly facing position.

2. The assembly of claim 1, wherein the first openings are positioned at a first elevation and the second openings are position at a second elevation above the first elevation.

3. The assembly of claim 2, wherein the seat includes a seat back having a recessed portion formed in a front surface of the seat back which defines a lower ledge, and wherein the anchor belt engages the lower ledge when the anchor belt is threaded through the second openings.

4. The assembly of claim 3, wherein the leash is coupled to the front surface of the seat back.

5. The assembly of claim 3, further including a leash holder coupled to the leash and provided to retain the leash in a gathered position when the anchor belt is threaded through the second openings.

6. The assembly of claim 5, wherein the leash holder includes first and second retainer straps able to be coupled to one another.

7. The assembly of claim 2, wherein the seat includes a seat back and the leash is coupled to a rear surface of the seat back.

8. The assembly of claim 7, wherein the seat back is formed to define an access slot and the leash extends through the access slot.

9. The assembly of claim 8, wherein the leash is in an extended position adjacent a front surface of the seat back when the anchor belt is threaded through the first pair of openings and wherein the leash is in a retracted position adjacent the rear surface of the seat back when the anchor belt is threaded through the second openings.

10. The assembly of claim 8, wherein the seat back further includes a recessed portion formed in a front surface of the seat back which defines a lower ledge, and wherein the access slot is positioned in the recessed portion and the anchor belt engages the lower ledge when the anchor belt is threaded through the second pair of openings.

11. The assembly of claim 2, wherein the seat includes a seat bottom, side walls coupled to the seat bottom, and a rim coupled to each side wall, and wherein the rim includes the first pair of openings.

12. The assembly of claim 11, wherein the leash is coupled to one of the rims of the seat.

13. The assembly of claim 1, wherein the seat further includes a seat back and spaced-apart vertical support members positioned to extend away from a rear surface of the seat back and each formed to include the second pair of openings for threadably receiving with the anchor belt.

14. The assembly of claim 13, wherein the seat back further includes a horizontal support member coupled to the rear surface of the seat back and the leash is coupled to the horizontal support member.

15. The assembly of claim 14, wherein the seat back is formed to define an access slot and the leash is received through the access slot when the anchor belt is threaded through the first pair of openings.

16. The assembly of claim 14, wherein the anchor belt lies adjacent the rear surface of the seat back when the anchor belt is threaded through the second pair of openings.

17. The assembly of claim 13, wherein the leash is coupled to one of the vertical support members.

18. The assembly of claim 13, wherein the seat includes side walls and the leash is coupled to one of the side walls.

19. The assembly of claim 18, wherein each side wall includes a rim and the leash is coupled to the rim of the side wall.

20. The assembly of claim 19, wherein the rim is generally U-shaped and defines an inner surface, and further wherein the rim includes a mount coupled to the inner surface and the leash is coupled to the mount.

21. The assembly of claim 19, wherein the rim includes a storage compartment adapted to store the anchor belt therein when the anchor belt is not received within the first or second pair of openings, and further wherein the leash remains coupled to the rim while the anchor belt is stored within the compartment.

22. The assembly of claim 13, wherein the leash is coupled to a forwardly facing surface of the seat back.

23. The assembly of claim 22, wherein the seat back is formed to define an access slot and leash is received through the access slot when the anchor belt is threaded through the second pair of openings.

24. The assembly of claim 22, wherein each side wall includes an outer rim and each first opening is formed in one of the rims.

25. A juvenile seat assembly is provided for use with both a vehicle passenger seat and anchor mounts provided near the vehicle seat, the assembly comprising
   a juvenile seat, and
   a vehicle anchor system including an anchor belt adapted to be coupled to the anchor mounts and a leash coupled to the juvenile seat and to the anchor belt.

26. The assembly of claim 25, wherein the system is positionable in either a first anchored position to anchor the juvenile seat in a rearwardly facing position on the passenger seat or a second anchored position to anchor the juvenile seat in a forwardly facing position on the passenger seat, the first and second positions being distinct from one another.

27. The assembly of claim 26, wherein the leash remains coupled to the seat and to the anchor belt when the system is moved between the first and second anchored positions.

28. The assembly of claim 27, wherein the seat includes a seat bottom and the anchor belt engages the seat bottom when the anchor belt is in the first anchored position and received within the first belt receivers.

29. The assembly of claim 26, wherein the seat further includes a first pair of belt receivers and a second pair of belt receivers and wherein the seat occupies the rearwardly facing position when the anchor belt communicates with the first pair of belt receivers and the seat occupies the forwardly facing position when the anchor belt communicates with the second pair of belt receivers, and wherein the first belt receivers are positioned below the second belt receivers.

30. The assembly of claim 29, wherein the first and second belt receivers are openings formed in the juvenile seat.

31. The assembly of claim 29, further including an element coupled to the seat bottom which defines an opening and wherein the first belt receivers are the opening formed in the element.

32. The assembly of claim 31, wherein the element is a side wall integrally coupled to the seat bottom.

33. The assembly of claim 25, wherein the anchor belt includes a strap having opposite ends and a connector coupled to each end of the strap and adapted to be coupled to the anchor mounts.

34. The assembly of claim 33, wherein the strap includes a central portion positioned between each end and the leash is coupled to the central portion of the strap.

35. The assembly of claim 34, wherein the anchor belt includes an adjuster used to adjust a length of the central portion of the strap extending between each connector.

36. The assembly of claim 33, wherein each connector includes a slot for receiving the strap therethrough and a hook adapted to couple with one of the anchor mounts.

37. A juvenile seat assembly is provided for use with both a vehicle passenger seat and anchor mounts provided near the vehicle seat, the assembly comprising a juvenile seat having a rearward anchor and a forward anchor, an anchor belt having end portions and a central portion between the end portions, the anchor belt being adapted to be coupled to the anchor mounts and provided for communication with the rearward and forward anchor means, and a leash coupled to the seat and to the central portion of the anchor belt, the rearward anchor being provided for receiving the anchor belt in a first anchored position when the seat occupies a rearwardly facing position and the forward anchor being provided for receiving the anchor belt in a second anchored position when the seat occupies a forwardly facing position.

38. The assembly of claim 37, wherein the leash remains coupled to the seat and to the anchor belt when the anchor belt is positioned to communicate with the rearward anchor, when the anchor belt is positioned to communicate with the forward anchor, and when the anchor belt is moved between communication with the rearward anchor and communication with the forward anchor.

39. The assembly of claims 38, wherein the rearward anchor is a first pair of openings formed in the seat and the forward anchor is a second pair of openings formed in the seat, and wherein the first openings are positioned at a first elevation and the second openings are positioned at a second elevation above the first elevation.

40. A juvenile seat assembly is provided for use with both a vehicle seat and at least two anchor mounts provided near the vehicle seat, the assembly comprising a juvenile seat having first and second belt receivers, a coupler coupled to the juvenile seat, and a vehicle anchor belt having a first end adapted to be coupled to one anchor mount of the seat and a second end adapted to be coupled to a second anchor mount of the seat, the vehicle anchor belt being coupled to the juvenile seat by the coupler of the assembly, the anchor belt being movable between a first position in communication with the first belt receivers and a second position in communication with the second belt receivers, the first position being distinct from the second position, the coupler keeping the anchor belt coupled to the juvenile seat during movement of the anchor belt between the first and second positions.

* * * * *